United States Patent [19]

Erickson

[11] 4,132,766
[45] Jan. 2, 1979

[54] SEPARATION OF OXYGEN FROM GASEOUS MIXTURES WITH MOLTEN ALKALI METAL SALTS

[76] Inventor: Donald C. Erickson, 1704 S. Harbor La., Annapolis, Md. 21401

[21] Appl. No.: 799,945

[22] Filed: May 24, 1977

[51] Int. Cl.$^2$ ............................................. C01B 13/02
[52] U.S. Cl. ..................................... 423/579; 423/219
[58] Field of Search ................ 423/579, 385, 395, 219

[56] References Cited

U.S. PATENT DOCUMENTS

| 588,615 | 8/1897 | Sturart | 423/579 |
|---|---|---|---|
| 2,418,402 | 4/1947 | Gorin | 423/219 X |
| 3,310,381 | 3/1967 | Guerrieri | 423/579 |

OTHER PUBLICATIONS

Freeman, "J. Physical Chemistry", Vol. 60, 1956, pp. 1487–1493.

Kirk-Othmer Encyclopedia of Chemical Technology, vol. 10, 1966, pp. 854–855.

Primary Examiner—Edward J. Meros

[57] ABSTRACT

Oxygen is separated from air by a regenerative chemical process. Air is contacted with an oxygen acceptor comprised of a molten solution of alkali nitrite and nitrate salts at elevated temperature and pressure, causing the oxygen to react with the nitrite, and thereby increasing the proportion of nitrate in the salt solution. The oxidized oxygen acceptor is separated from the oxygen depleted air, and then its pressure is reduced while supplying heat, thereby causing the release of relatively pure oxygen, which is collected. The oxygen acceptor, restored to its approximate original composition, is recycled to the oxidation step. Since the oxygen acceptor remains in the liquid state throughout the cycle, both salt to salt heat exchange and salt circulation are facilitated, making possible a continuous process of high efficiency.

11 Claims, 2 Drawing Figures

SEPARATION OF OXYGEN FROM GASEOUS MIXTURES WITH MOLTEN ALKALI METAL SALTS

BACKGROUND OF THE INVENTION

The field of this invention is the one is which gaseous oxygen is produced by a chemical reaction. It is further distinguished in that the chemical which reacts to yield oxygen is regenerated by contacting it with air or other oxygen containing gas. Thus there is not net consumption of the chemical; the net result is that the input air is separated into an oxygen enriched gas and an oxygen depleted gas by the input of heat.

Oxygen is widely used in large amounts in various industries, predominantly in the manufacture of steel, and has the prospect of substantially greater consumption in future coal conversion and hydrogen generation processes.

The prior art of this field of invention includes U.S. Pat. Nos. 3,856,928; 3,579,292; 2,418,402; and 2,490,587. Numerous oxygen acceptors have been identified, including BaO, $Na_2MnO_4$, $CuCl_2$, SrO, and Hg. The attrubute of chemical air separation processes as a class is that the high pressure air which undergoes reaction and thereby loses part of its oxygen is still at high pressure after the reaction. Therefore it can be expanded through a turboexpander, recovering most or all of its compression energy. In contrast, in cyrogenic processes the air must at least partly be expanded through an orifice to develop the desired cooling effect, thereby expending the compression energy. Liquefaction processes accordingly consume electrical energy at the relatively high rate of 0.35 kWhr (1.2 × $10^6$ J) per kg $O_2$ produced, which is equivalent to 1 thermal kWhr per kg or 27.5 kcal/mole $O_2$. Nevertheless, the liquefaction process has been superior to prior art chemical separation processes for various reasons. All prior art processes have involved either an acceptor or an oxidized acceptor or both which are present in the solid state. This has made circulation of the acceptor composition difficult, and therefore most processes have been batch mode. Most batch mode processes have involved large pressure differences between the oxidation and decomposition parts of the cycle, and therefore have suffered from excessive vent and purge losses. Some processes have attempted to minimize this pressure difference by conducting the decomposition reaction at a higher temperature than the oxidation reaction. This imposes a large heat requirement: not only does the sensible heat of the acceptor have to be furnished, but the full endothermic heat requirement of the decomposition reaction must also be supplied. Together they add up to substantially more than the 27.5 kcal/mole needed for liquefaction. The same considerations have hindered the few continuous processes disclosed; the large pressure difference operating mode has made acceptor circulation extremely difficult (virtually impossible for fluidized beds), whereas the operating mode yielding more equal pressures has suffered from excessive energy requirements. Other problems with the prior art processes are that some of them result in unacceptable amounts of impurities in the product gas, e.g. chlorine or mercury, and some result in an unacceptable loss rate of the acceptor, due to chemical breakdown, chemical inactivation, or other possible causes.

SUMMARY OF THE INVENTION

The oxygen acceptor, comprised of molten alkali nitrates and nitrites, is contacted with a free oxygen containing gas mixture such as air, under conditions such that it undergoes reaction with part of the free oxygen, yielding a condensed phase oxidized oxygen acceptor. The condensed phase material is readily separated from the exhausting oxygen depleted gas, and then is caused to release its oxygen in relatively pure form by a decomposition reaction. The decomposition reaction is caused to occur by reducing the pressure and/or supplying heat, and may be aided by also supplying a stripping gas. Upon decomposition, the oxidized oxygen acceptor reverts to oxygen acceptor, and the evolved gas, enriched in oxygen content, is collected. Then the cycle is repeated. The prior art discloses both batch and continuous processing modes for chemical air separation, and both modes are applicable to this newly disclosed oxygen acceptor composition. Particularly high energy efficiencies are achieved when the respective oxidation and decomposition reactions are conducted in heat exchange relationship with one another, whereby the exothermic heat from the oxidation reaction supplies the bulk of the heat requirement of the endothermic decomposition reaction.

Among the objects of the present invention are to produce oxygen more efficiently and economically than heretofore possible; to provide an oxygen acceptor which is liquid and remains liquid when oxidized, thereby facilitating pumping and heat exchange and making possible a highly efficient continuous process; to disclose apparatus which can achieve high efficiency oxygen generation when using a liquid phase acceptor; and to provide an acceptor which introduces minimal impurities in the product oxygen and which is resistant to attrition during use.

THERMODYNAMIC BASIS OF THE INVENTION

Figure 1:
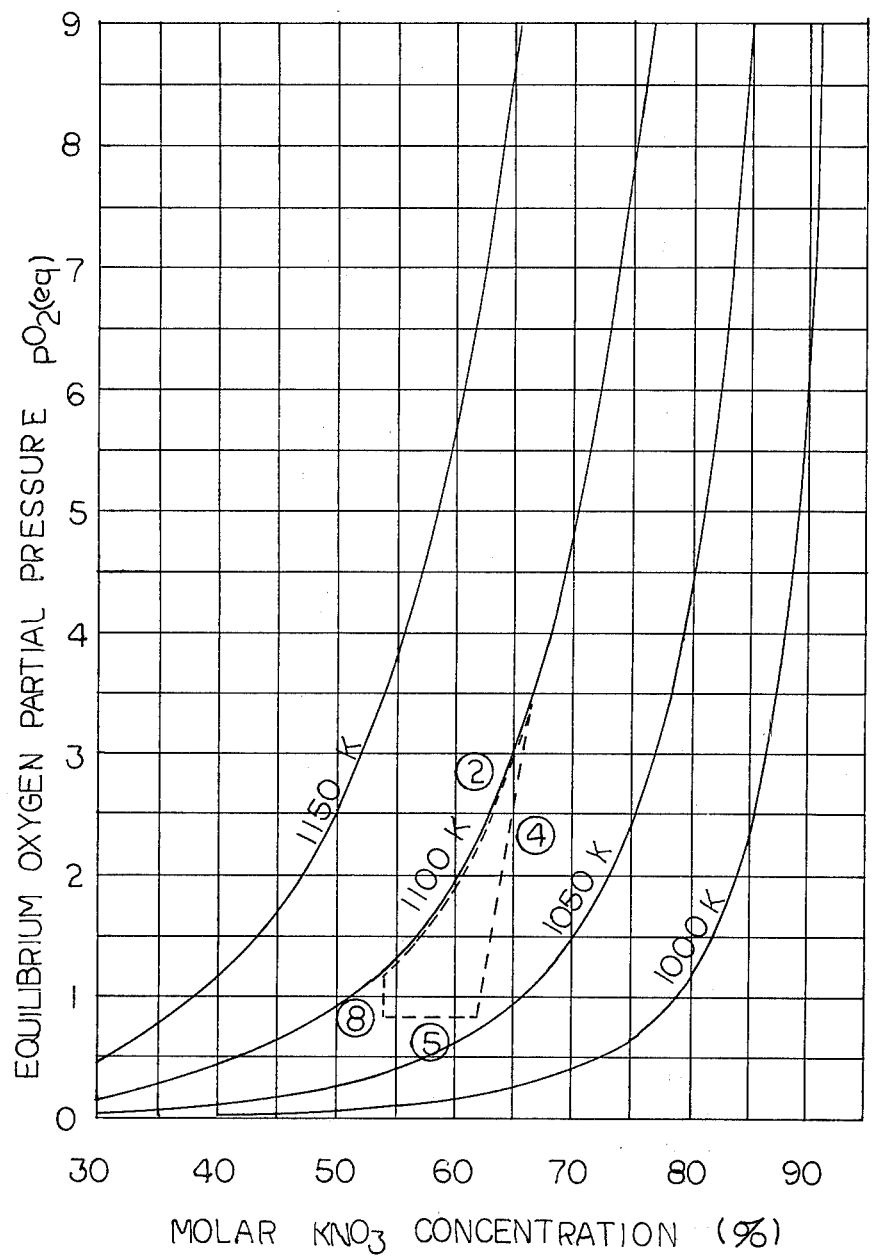
FIG. 1 illustrates the thermodynamic behavior of the disclosed oxygen acceptor; in particular it illustrates the effects of temperature and salt composition on the equilibrium oxygen partial pressure of the salt mixture.

The following thermodynamic principles provide the basis for understanding the disclosed process and for selecting preferred operating parameters for any desired embodiment. In all chemical air separation processes, the most fundamental characteristic to be considered is the equilibrium oxygen partial pressure, $pO_2$(eq). The essence of all processes in this field is to first contact air with an oxygen acceptor having a $pO_2$(eq) lower than the actual $pO_2$ of the air, thereby making possible the desired reaction between the acceptor and the $O_2$ in the air. Reaction conditions (i.e. temperature, method of contacting, residence time, etc.) must be such that the reaction between oxygen in the air and the oxygen acceptor will proceed at an acceptably rapid rate. No matter how rapid the rate, however, the reaction thermodynamically can not proceed beyond the point at which the $pO_2$ of the air equals the $pO_2$(eq). If full equilibrium is attained the $pO_2$ of the exhausting oxygen depleted air will be equal to $pO_2(eq)$. Thus if the $pO_2$ of the incoming air is only slightly above $pO_2(eq)$, only a small portion of the oxygen in the air can react, whereas if $pO_2$ of the incoming air is substantially above $pO_2(eq)$, most of the oxygen can react. The second step of all chemical separation processes, after oxidizing the oxygen acceptor, is to expose the oxidized oxygen acceptor to a gaseous atmosphere in which the existing $pO_2$ is lower than the $pO_2(eq)$ of the oxidized acceptor. This causes the acceptor to decompose and release oxygen, since the escaping tendency of the oxygen from the acceptor is greater than the escaping tendency of the oxygen from the gaseous atmosphere. The gaseous atmosphere with the required low $pO_2$ can be provided by drawing a vacuum, in which case fairly pure oxygen is collected, or it can be provided by sweeping the acceptor with a diluent gas such as nitrogen, air, or steam, in which case the evolved oxygen will have the corresponding impurity present. Similar to the oxidation reaction, the decomposition reaction must be conducted under conditions such that its rate is acceptably rapid. Process economics dictate that both reactions achieve a near approach to equilibrium conditions. Note that for the decomposition reaction, the $pO_2$ of the product gas being collected from that reaction can not exceed the $pO_2(eq)$ of the acceptor undergoing decomposition.

Clearly it is important to know how $pO_2(eq)$ varies with process conditions, such as choice of acceptor, temperature, etc. This can readily be determined from the well known expression for the equilibrium constant of a chemical reaction:

$$K_p = e^{-\Delta G^0/RT} = \frac{\prod_i (a_i)^{v_i}}{\prod_j (a_j)^{v_j}}$$

where
- $a_i$ = activity of product i
- $a_j$ = activity of reactant j
- $v_i$ = stoichiometric coefficient of product i
- $v_j$ = stoichiometric coeefficient of reactant j
- activity = partial pressure for gas phase substances
- activity = 1 for pure condensed phase substances
- activity = mole fraction for condensed phase substances in ideal solution
- $\Delta G^0$ = change in free energy of the reaction at temperature T when all reactants and products are in their standard states.

For example for the reaction $$2KNO_2 + O_2 = 2KNO_3 \quad (1)$$

$$K_p = e^{-\Delta G^0/RT} = \frac{(aKNO_3)^2}{(aKNO_2)^2 \, pO_2}$$

$$\text{thus } pO_2(eq) = \frac{aKNO_3^2}{aKNO_2} \cdot \frac{1}{K_p}$$

If the material undergoing oxidation and the resulting oxidized material ($KNO_2$ and $KNO_3$ respectively in this example) are both pure substances, and therefore have unit activity, the $pO_2(eq)$ equals $1/K_p$. $\Delta G^0$ equals $\Delta H^0 - T\Delta S^0$, and is given by Bartholomew (Journal of Physical Chemistry, 70, 1966) as $-54 + 0.0488T$ kcal for the above reaction. Since $\Delta G^0$ varies linearly with temperature, both $K_p$ and $pO_2(eq)$ will vary exponentially with temperature. Furthermore, this exponential variation of $pO_2(eq)$ with temperature will hold constant regardless of how much or how little of the acceptor is oxidized. This situation changes if either the acceptor or oxidized acceptor is present in solution, i.e. at less than unit activity. In that case as the amount of the dissolved substance changes, its activity changes, which in turn causes the $pO_2(eq)$ to change even when temperature is held constant. The alkali nitrate-alkali nitrite system, when molten, is one wherein both materials are present in solution; indeed they are dissolved in each other. Thus, as shown above, in this type of system the $pO_2(eq)$ varies with the square of the ratio of concentration of each salt in the mixture, $[KNO_3]/[KNO_2]$, as well as with temperature. The variation of $pO_2(eq)$ with both temperature and concentration ratio is illustrated in FIG. 1. That figure is drawn for the condition of no impurities in the melt. The %$KNO_2$ is thus given by 100 — %$KNO_3$, and the concentration ratio is %$KNO_3/(100 - \%KNO_3)$.

As can be seen on FIG. 1, high concentration ratios cause the $pO_2(eq)$ to attain very large values, wherein undesirably high air pressure would be required to make the oxidation reaction proceed. Conversely, low concentration ratios cause the $pO_2(eq)$ to be reduced to very small, subatmospheric values. This is undesirable since a large vaccum or large amount of stripping gas would be required for decomposition, and the size of process equipment would be vary large. Thus for practical considerations the concentration ratio should be kept between 0.3 and 10, and preferably between 0.5 and 5.

The general temperature range of 800K to 1200K is preferred for the process. Lower temperatures in this range are desirable provided reaction kinetics is rapid enough. The temperatures depicted on FIG. 1 are representative of those which can be used with potassium cation salts. With sodium or lithium cations, even lower temperatures can be used. However that advantage must be counterbalanced against the fact that sodium and lithium cations greater concentrations of superoxides in the melt, as will be explained subsequently. A mixture of potassium and sodium cations is advantageous because it yields a very low melting point for the salt, and also due to its low cost. However all the alkali cations, either individually or in any combination, are applicable to the teachings of this invention.

Reaction (1) above reflects the overall stoichiometry of the desirable reactions taking place in the salt melt. It will be understood however that it is a simplification, not necessarily representing an actual reaction mechanism, and furthermore that many other reactions will be simultaneously occurring in the melt, some of which are detrimental in effect. For example, all of the following reactions would also be expected to occur;

$$2KNO_3 = 2KO_2 + N_2 + O_2; \quad K_p = \frac{pN_2 pO_2 (aKO_2)^2}{(aKNO_3)^2} = 2.57 \times 10^{-2} \quad (2)$$

$$N_2 + O_2 = 2NO; \quad K_p = \frac{(pNO)^2}{pN_2 pO_2} = 2.3 \times 10^{-4} \quad (3)$$

$$2KNO_3 + H_2O = 2KOH + N_2 + 2.5O_2 \quad (4)$$

$$K_p = \frac{(aKOH)^2 pN_2 (pO_2)^{2.5}}{pH_2O(aKNO_3)^2} = 176$$

$$2KNO_3 + CO_2 = K_2CO_3 + N_2 + 2.5O_2 \quad (5)$$

$$K_p = \frac{aK_2CO_3 \, pN_2 (pO_2)^{2.5}}{pCO_2 (aKNO_3)^2} = 1.05 \times 10^6$$

The equilibrium constant values are given for 1100K. Reaction (2) shows that there will be an equilibrium content of $KO_2$ in the melt, and also that during the decomposition reaction some $N_2$ will be evolved in addition to the major product $O_2$. The $N_2$ that is evolved on decomposition is replaced when the $KO_2$ reacts with the $N_2$ in the incoming air. Thus the difference in $KO_2$ concentration between the oxidation and decomposition reaction zones is indicative of how much $N_2$ will be released into the product $O_2$. This is one consideration for choice of alkali cations; those alkalis having "weaker" superoxides, i.e. less negative $\Delta G_f$, will have smaller proportions of superoxide in the melt, thereby yielding less $N_2$ in the product $O_2$. Another consideration arising from reaction (2) is that there is very little detriment to introducing a small amount of air into the decomposition reaction, since the nitrogen introduced that way will for the most part replace nitrogen which otherwise would be evolved from the salt.

Reaction (3) emphasizes that oxides of nitrogen will also be present, although to a very small extent. This is particularly important since the nitrate and nitrite salts can both decompose to superoxides, yielding oxides of nitrogen. When the oxide of nitrogen partial pressure in the salt is greater than that in the gas, the nitrates and nitrites will tend to decompose to superoxides; conversely, when the oxide of nitrogen partial pressure in the gas is larger, the nitrates and nitrites will tend to be regenerated from the superoxides. If the choice of alkali cations plus the operating conditions (e.g. temperature and pressure) result in slow decomposition of the nitrates and nitrites in favor of superoxides, one of several corrective courses can be adopted. Either fresh makeup salt can be periodically added, or the salt can be periodically or proportionally exposed to concentrated oxides of nitrogen, or a very small addition of oxides of nitrogen can be made to one of the incoming process gas streams. Any of these actions would terminate the slow loss of active species from the melt.

Since in some embodiments as much as 0.1% of $NO_x$ will be present in the exhaust gas from the salt melt, it may be necessary to further treat this gas before releasing it to the atmosphere. A particularly advantageous means of doing this would be to use the hot gas to support combustion. It still has appreciable free oxygen content, and the combustion process, particularly when conducted at low pressure will act to decompose the $NO_x$.

Reactions (4) and (5) reflect undesirable but to some extent unavoidable side reactions. The equilibrium constants show that appreciable equilibrium concentrations of hydroxide and carbonate will be present in the melt even if the $H_2O$ and $CO_2$ in the incoming air are reduced to trace, ppm quantities. For example, a $CO_2$ concentration of 6 ppm in the incoming air results in an equilibrium molar concentration of approximately 10% $K_2CO_3$ in the melt. The $H_2O$ requirements are not as severe; approximately 4000 ppm $H_2O$ is required to yield an equilibrium concentration of 10% $KOH$ in the melt. The presence of hydroxides and carbonates in the melt is not a detriment to the basic reaction desired, reaction (1). Their detrimental effect is that they require a greater amount of salt to be circulated for a given level of $O_2$ production, i.e. they are in effect inert diluents. Thus somewhat greater energy will be required both for salt heating and for salt circulation. In order to limit this extra energy requirement, it is desirable that the active species nitrate and nitrite comprise at least 50% and preferably more than 80% of the melt. It is noted that most chemical air separation processes are subject to this type of undesirable effect from $CO_2$ and $H_2O$. The liquefaction approach to physical air separation also requires that $CO_2$ and $H_2O$ be reduced to trace quantities, in order to prevent solids accumulation in the cryogenic units. For any of these processes, including the present invention, conventional means for drying and $CO_2$ removal are available and should be employed.

The preceding thermodynamic explanation of various phenomena associated with the process of this invention reflects the current level of understanding, but is subject to reinterpretation as additional evidence is obtained. Therefore it should not be construed to limit the invention as defined by the claims.

DESCRIPTION OF THE PREFERRED EMBODIMENT

Figure 2:
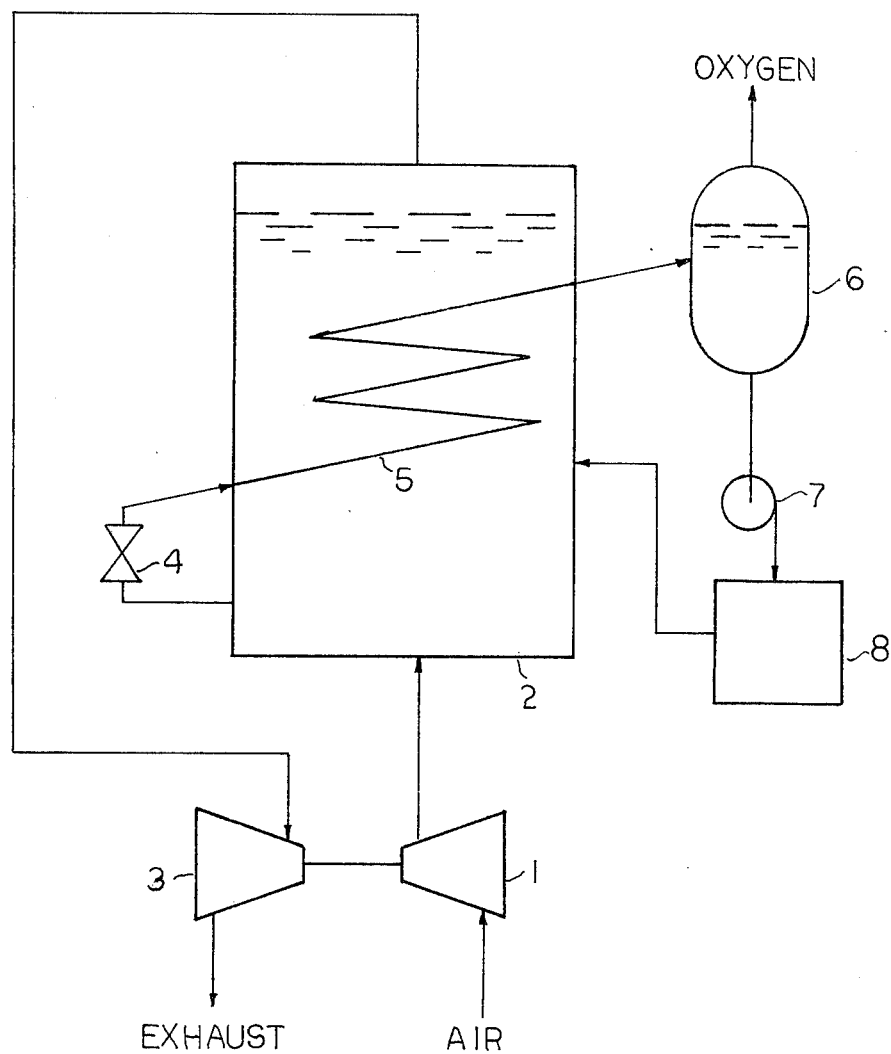
FIG. 2 is a schematic flowsheet representation of an apparatus suitable for the practice of this invention in the continuous mode, and in which means for reaction heat exchange is incorporated.

The basic teaching of this specification is the composition of a new material suitable for use as an oxygen acceptor. It can be used in any of the prior art disclosed processes. However it can also be used in a modified process which takes advantage of the acceptor being a liquid, and which results in higher process efficiencies than heretofore realized. This modified process is thus the preferred embodiment. It is a continuous process in which reaction heat is exchanged between the oxidation and decomposition reactions and in which the compression energy of the exhaust is recovered in a turboexpander or similar means for recovering compression energy. This embodiment is illustrated in schematic flowsheet form in FIG. 2. In that figure air is compressed in compressor 1 and then introduced into oxidation reactor 2 so as to contact and react with the molten acceptor composition contained therein. The exhaust, oxygen depleted air, is then expanded through turboexpander 3, thereby recovering its compression energy. The mechanical energy developed by the turboexpander can advantageously be used to supply motive power to the compressor, for example by direct mechanical coupling. The exhaust from the turboexpander, which normally will be quite hot and always contains residual oxygen, can optionally be used to support combustion in a process heater. The molten salt circulates in a closed loop in the apparatus. After it is oxidized in reactor 2, it is reduced in pressure in a means for pressure reduction 4, e.g. a valve, orifice, or expander pump, and then is routed into decomposition reactor 5. The decomposition reactor should be in direct heat exchange contact with the acceptor. In the figure it is portrayed as one or more coils of pressure tubing submerged in the melt contained in the oxidation reactor. It will be realized that this geometry could be inverted, i.e. decomposition could occur in a pot type reactor while oxidation occurs in submerged tubes. One advantage of the inverted arrangement is that no separate separator is required. Various other configurations also are possible. The design of the decomposition reactor however must take cognizance that oxygen gas is being generated therein, and therefore must provide for two phase flow. The schematic reflects this by depicting a continuous upward slope for all tubing in which product gas is generated, thereby precluding pockets of gas from collecting which would block off the salt flow. It should be noted that generation of product gas begins at the point where the pressure is reduced, even before heat addition to the salt begins; the sensible heat of the salt supports the initial decomposition reaction, causing the salt to cool. From decomposition reactor 5, the two phase flow of product gas and salt is directed into separator 6. The product gas, variously referred to as oxygen or oxygen enriched air, is collected overhead. The salt is then increased in pressure in the means for increasing pressure 7, e.g. a pump. Depending on the type of pump chosen, it may be necessary to regeneratively cool and then reheat the salt in order to stay within pump temperature limits. After its pressure is increased the salt is then optionally heated to increase its temperature in heater 8. Other means of adding heat are possible, e.g. submerged heaters directly in the reaction vessel or superheating the incoming air, but the preferred method is a separate salt heater as shown. Finally the salt is routed back to oxidation reactor 1 to complete the cycle.

For any set of plant operating parameters chosen, FIG. 1 can be used to analyze the results. The dashed closed loop on FIG. 1 illustrates this technique. That loop reflects the salt conditions — temperature and composition — as it undergoes one complete cycle at steady state. The encircled numbers signify the numbered items of apparatus from FIG. 2 corresponding to each segment of the cycle. The particular cycle drawn reflects a total air pressure (i.e. compressor outlet pressure) of 30 atmospheres absolute. Reactor 2 is maintained at 1100K, and the salt is introduced into the reactor with a $KNO_3$ concentration of 54% (balance $KNO_2$ in this example). Oxidation occurs in the reactor, increasing the salt $KNO_3$ to 67%, and decreasing the $pO_2$ of the air from 6.3 atmospheres to 3.4 atmospheres. Then the salt is reduced in pressure by valve 4. When the salt pressure drops below 3.4 atmospheres, spontaneous decomposition initiates, which causes both the temperature and the $KNO_3$ concentration of the salt to decrease. This spontaneous decomposition is the reason the pressure reduction line is not strictly vertical; the adiabatic temperature change of the salt will be approximately 10K for each $\%KNO_3$ decomposed. Decomposition will continue until the $pO_2(eq)$ of the salt is equal to the $pO_2$ of the gas product being collected. In this example, oxygen is being collected at a partial pressure of 0.8 atmospheres; thus the salt temperature will decrease to approximately 1055K. The salt then enters the decomposition reactor 5, which is in heat exchange contact with the 1100K salt. Heat is thus transferred to the decomposing salt, causing $O_2$ to continue to evolve and increasing the salt temperature. In this example the heat exchange area is sized such that the salt temperature will reach 1080K by the time it exits from the decomposition reactor. The pump causes no discernible change in either temperature or $KNO_3$ concentration. The heater 8 raises the salt temperature, to 1100K in this example. From this plot of the cycle, it can be determined that 10.34 moles of air must be compressed and 15.38 moles of salt solution must be circulated per mole of $O_2$ produced. The heat load of the heater is therefore 8.3 kcal per mole of $O_2$ produced, at a temperature above 1100K. Note how favorably this compares with the 27.5 kcal/mole $O_2$ requirement of liquefaction processes. The 8.3 kcal represents the net heat addition to the salt; it leaves the process as either the increase in sensible heat of the air stream or as thermal losses through the insulation. Note also the advantages of reaction heat exchange; if the decomposition reaction were conducted at or above the temperature of the oxidation reaction, such that no exchange of reaction heat occurred, the full endothermic requirement of the decomposition reaction would have to be supplied by some type of heating device, which amounts to 54 kcal/mole $O_2$, i.e. double the requirement of liquefaction plants. Note also that in the previous example, if the $KNO_3$ and $KNO_2$ comprise a more realistic 80% of the salt vice the 100% cited in the example, the salt circulation and heater requirements will be 25% larger than cited, but still well under liquefaction plant requirements.

The respective reactors should be sized to yield a salt residence time in each reactor sufficient to achieve a near approach to equilibrium. Acceptable residence times will generally fall between a few seconds and several minutes, e.g. in the range of 5 seconds to 10 minutes.

If the source of heat to the heater 8 is a combustion gas, then the exhaust combustion gas from the heater, being above 1100K, still has substantial energy content. Two advantageous ways to make use of that thermal energy are as follows. It could be used to further heat the compressed air before it enters reactor 2. Also it could be applied as reheat to the turbo-expander, i.e. the exhaust from the reactor would be partially expanded, which causes cooling, then reheated, and then undergo additional expansion. In that way more compression energy can be recovered. Similarly, the sensible heat of the oxygen product can be used to advantage. As mentioned earlier, the exhausting oxygen depleted gas could be used to support combustion, for example in the heater.

Another substantial advantage which derives from using alkali nitrate-nitrite melts as the oxygen acceptor composition is the ease of startup and shutdown operations, i.e. no problem with the melt solidifying within process apparatus. Two factors contribute to this characteristic. First, all the alkali nitrate and nitrite salts have relatively low melting points, which are made even lower by the mixture, generally below 500K. Secondly, near their melting point, liquid water can be added, thereby forming an aqueous solution which remains liquid when cooled to ambient. During heatup the water simply boils off; all the water is gone before temperatures are reached at which it would react significantly with the salt to form hydroxide.

In the preferred embodiment just described all values cited are subject to experimental error, and therefore only indicative of general ranges of preferred operation. Also, they reflect use of substantially potassium salts; for other alkalis or mixtures of alkalis, the temperature—composition—$pO_2(eq)$ characteristic is somewhat different.

Oxidation reaction pressures in the general range of 5 to 100 atmospheres and decomposition reaction pressures in the general range of subatmospheric pressure to 15 atmospheres are suitable for the practice of this invention.

I claim:

1. In a continuous process for producing oxygen which comprises the repeated steps of contacting air with an oxygen acceptor which becomes oxidized, separately releasing the oxygen from the oxidized oxygen acceptor so as to regenerate the oxygen acceptor and generate the product oxygen and recycling regenerated oxygen acceptor, the improvement which comprises: said oxygen acceptor a molten solution comprised of alkali metal nitrite and nitrate salts wherein the ratio of alkali metal nitrate to alkali metal nitrite in the solution is maintained greater than 0.3

2. The process of claim 1 wherein the heat released by the exothermic reaction between the oxygen acceptor and air is indirectly transferred to supply at least part of the heat required by the endothermic oxygen releasing reaction.

3. The process of claim 1 wherein at least 50% of the molten salt solution consists of alkali metal nitrate and nitrate salts, and wherein the alkali metal is potassium, sodium, or mixtures thereof.

4. A method of continuously producing a gas enriched in oxygen content from an oxygen containing gas mixture comprising the steps of:
   a. establishing an oxygen acceptor comprised of a molten solution of alkali metal nitrate and nitrite salts, wherein the molar ratio of alkali metal nitrate to alkali metal nitrite in the solution is maintained greater than 0.3
   b. contacting the oxygen containing gas mixture with the oxygen acceptor, thereby oxidizing part of the dissolved alkali metal nitrite to nitrate and depleting the oxygen content of the oxygen containing gas mixture;
   c. separating the oxidized oxygen acceptor from the oxygen depleted gas mixture;
   d. decomposing part of the dissolved alkali metal nitrate to nitrite and oxygen, thereby regenerating the oxygen acceptor and yielding said gas enriched in oxygen content;
   e. separating the gas enriched in oxygen content from the regenerated oxygen acceptor;
   f. recycling the regenerated oxygen acceptor to step b. above.

5. The method of claim 4 wherein the oxidation reaction and the decomposition reaction are conducted concurrently and in heat exchange relationship, thereby causing at least part of the heat released in the exothermic oxidation reaction to supply at least part of the heat required by the endothermic decomposition reaction.

6. The method of claim 4, wherein at least 50% of the molten salt solution consists of alkali metal nitrate and nitrite salts, and the molar ratio of alkali metal nitrates to alkali metal nitrites in the salt solution is maintained within the approximate limits of 0.3 to 10, and the salt solution temperature is maintained within the approximate limits of 800K to 1200K; and the pressure of the oxidation reaction is maintained within the approximate limits of 5 to 100 atmospheres; and the pressure of the decomposition reaction is maintained within the approximate limits of subatmospheric pressure to 15 atmospheres.

7. The method of claim 6 wherein the alkali metal is potassium, sodium, lithium, or mixtures thereof.

8. The method of claim 6 wherein at least one reaction vessel is provided to contain the salt solution throughout the cycle of steps comprising the method, and wherein the portion of salt solution contained in each respective vessel remains in that vessel throughout the cycle.

9. The method of claim 6 wherein separate reaction vessels are provided for the respective oxidation and decomposition reactions, and the salt solution is circulated between the respective vessels in the course of the cycle.

10. The method of claim 6 wherein the decomposition reaction is caused to occur by decreasing the pressure of the salt solution below its prevailing equilibrium oxygen partial pressure.

11. The method of claim 4 wherein the oxygen containing gas mixture is compressed prior to contacting the oxygen acceptor, and the compression energy of the oxygen depleted gas mixture is recovered by expanding it through a turbo-expander, and wherein the expansion takes place in two stages with reheating of the oxygen depleted gas mixture occurring between stages.

* * * * *